Oct. 23, 1928.
J. W. CROWHURST
1,688,802
FROST PREVENTION APPARATUS
Filed April 13, 1927
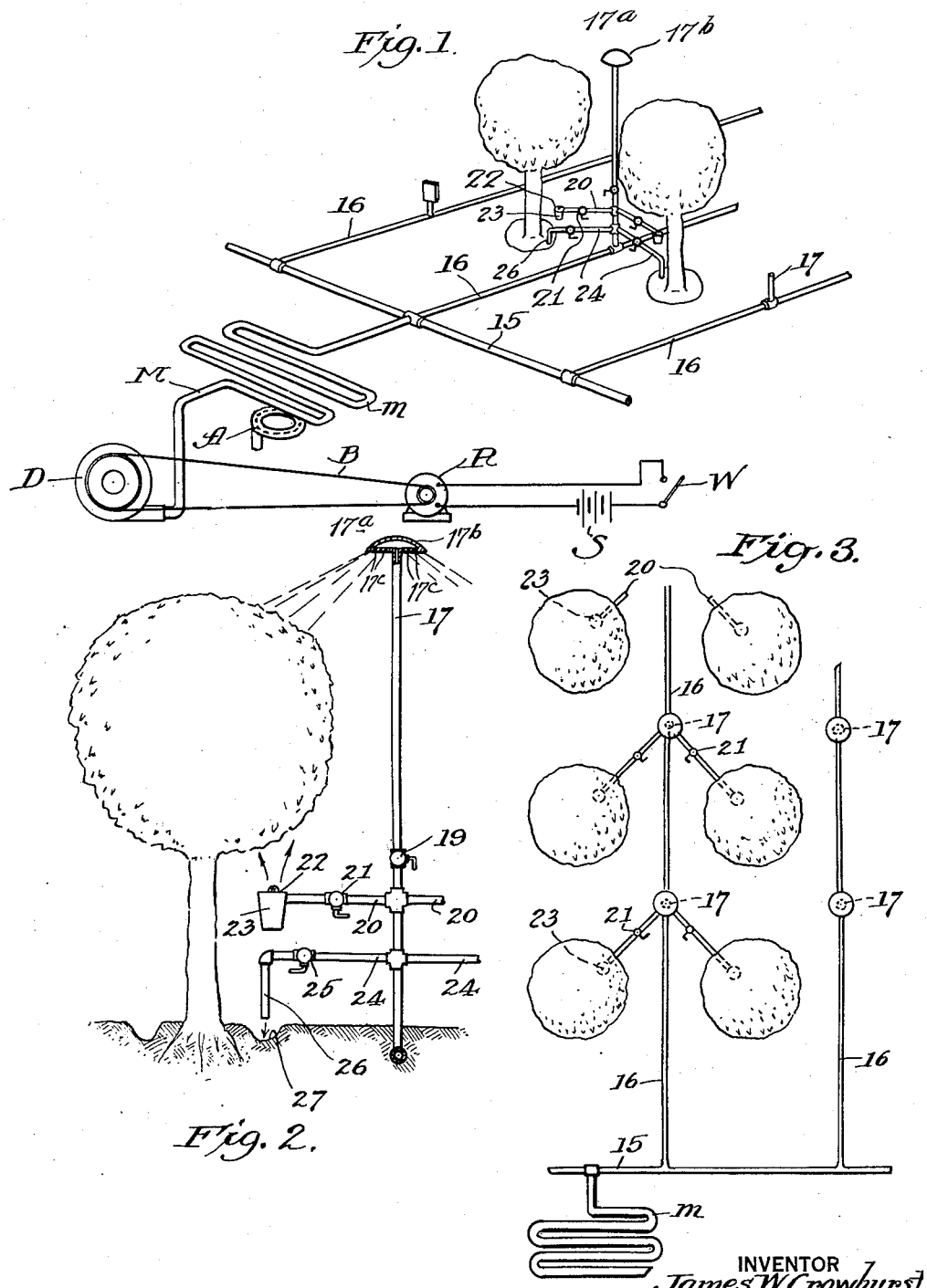

Patented Oct. 23, 1928.

1,688,802

UNITED STATES PATENT OFFICE.

JAMES W. CROWHURST, OF LOS ANGELES, CALIFORNIA.

FROST-PREVENTION APPARATUS.

Application filed April 13, 1927. Serial No. 183,543.

My invention relates to apparatus for the prevention of frost in orchards, groves, vineyards, and the like, and the resultant damage of frost to vegetation.

It is a purpose of my invention to provide an apparatus by which the distribution of any suitable fluid under pressure, such as air, smudge and the like, can be effected in relation to growing vegetation to produce sufficient agitation of the air surrounding the vegetation to permit evaporation to the extent of preventing condensation of the atmospheric moisture, and thereby preventing the formation of frost.

It is also a purpose of my invention to provide an apparatus of the above described character in which the distribution of the pressure fluid is effected automatically and only when the temperature of the atmosphere surrounding the vegetation approaches freezing point, thereby eliminating the human element in setting the apparatus into operation when necessary to prevent formation of frost on the vegetation.

A further purpose of my invention is the production of an apparatus which, in addition to providing means for the distribution of a pressure fluid, also provides means for distributing liquids when it is desired to spray the vegetation with a suitable insecticide or when irrigating the vegetation.

I will describe only one apparatus for preventing the formation of frost on vegetation, embodying my invention, and will then point out the novel features thereof in claims.

In the accompanying drawings,

Figure 1 is a view showing in perspective one form of frost preventing apparatus embodying my invention;

Figure 2 is a fragmentary view showing in vertical section a portion of the apparatus shown in Figure 1;

Figure 3 is a fragmentary plan view of the apparatus shown in Figure 1, all of the views showing the apparatus in applied position to the fruit trees of an orchard.

Referring specifically to the drawings, my invention, in its present embodiment, comprises a main pipe M, one end of which is connected to a fluid pressure device D which latter, in the present instance, is in the form of a rotary blower adapted to be operated by an electric motor R through a pulley and belt connection B. The opposite end of the main pipe M is connected to a transverse distributing pipe 15 for distributing the pressure fluid to all of a plurality of subsidiary distributing pipes 16 connected at intervals along the length of the pipe 15 and adapted to extend between the rows of fruit trees, as illustrated in Figures 1 and 3. The pipes M, 15 and 16 may be situated above or within the ground, and the pipes 16 may be arranged in any suitable manner with respect to the rows of vegetation to economize in the use of piping and to permit plowing of the ground with the least possible interference.

Preferably at a point centrally between any four adjacent trees, as illustrated in Figure 3, is an upwardly extending branch pipe 17 connected at its lower end to the adjacent pipe 16. As shown in Figure 1, the upper end of each pipe 17 is positioned so that its outlet end indicated at 17$^a$ is arranged to discharge the pressure fluid employed downwardly over the trees, as indicated by the dash lines in Figure 2.

In the adaptation of my invention to fruit trees or any other form of vegetation which rises to an appreciable height above the ground, atmospheric air is employed as the pressure fluid. To this end, the blower D is provided which operates to force air from atmosphere through the pipe M into the pipe 15, and from the latter through the several subsidiary distributing pipes 16. From the latter pipes the air is conducted upwardly by the branch pipes 17 and finally discharged from the ends 17$^a$ of the latter downwardly onto the trees. In Fig. 2, the upper end 17$^a$ of one of the pipes 17 is shown in detail and is typical of the upper end of all of the pipes. The upper end of each pipe is provided with a nozzle in the form of a hollow head 17$^b$ having its underside provided with downwardly and outwardly directed discharge ports 17$^c$ through which the air is discharged from the pipes onto the trees. The force or pressure of the air discharged from the branch pipes may be controlled by regulation of the rotational speed of the blower or by the provision of valves 19 in the pipes 17. The pressure of the air discharged is such as to create a mild wind or breeze which is sufficient to agitate the air surrounding a particular tree and to the extent of promoting evaporation of the atmospheric moisture and thereby preventing the condensation of such moisture whereby the formation of frost is prevented. In the treatment of fruit trees and the like, cold air can be employed as the pressure fluid, and the promotion of evaporation of atmospheric moisture enhanced by discharging the air from the pipe ends 17ª with a force sufficient to produce air currents which impinge against the ground adjacent the tree and rebound upwardly, the air in contacting with the warm ground being raised in temperature. This relatively warm air rising through the trees further tends to prevent condensation of the atmospheric moisture and thereby contributes strongly to the prevention of frost formation on the trees.

In the adaptation of my invention to vineyards or any other form of vegetation disposed in relatively close proximity to the ground it is necessary in order to properly protect vegetation against frost formation to heat the pressure fluid. To this end, the pipe M is constructed to provide a plurality of coils m which are adapted to be heated by any suitable means, such as the burner A illustrated in Figure 1, so that the air traversing the coils will be heated in its passage to the distributing pipes 17 and thus raised in temperature as discharged onto the vegetation. Instead of employing the heater A, the blower D may be connected to a smudge pot in a manner to draw the smudge therefrom and blow it through the piping system for final discharge onto the vegetation from the branch pipes 17.

In practice, it is desirable that the operation of the apparatus be rendered automatic to eliminate the uncertainty of the human element in setting the apparatus in operation when required. To effect such automatic operation, the motor R is included in the circuit provided with a source of current such as a battery S and a thermo-responsive switch W. This switch is so situated as to be exposed to the air surrounding the vegetation being treated, and it is designed to normally maintain the motor circuit open until the temperature of the atmosphere approaches freezing point, when the switch automatically closes, thereby permitting current to be supplied to the motor R and thereby setting the latter into operation. It will be understood that with the operation of the motor the blower D is likewise set into operation, thereby causing the apparatus to function as described in preventing frost formation on the vegetation.

At such times when the apparatus is not used for the prevention of frost in the manner described, it can be employed to spray the vegetation with suitable insecticide or the irrigation of the vegetation. When spraying the trees with insecticide the blower D will operate in the normal manner to force air through the piping system but to discharge such air through branch pipes 20 connected to the pipe 17 at points below the valves 19. These pipes 20 are disposed horizontally, so that their outer ends will be positioned beneath the vegetation to be sprayed. Valves 21 are provided in the pipes 20 for controlling the discharge of air from such pipes and at the outer ends of these pipes are arranged nozzles 22 which are associated with insecticide containing receptacles 23 in such manner that the air discharged will effect a spraying of the insecticide upwardly onto the vegetation.

To irrigate the vegetation, pipes 24 are provided connected in pairs to the pipes 17 at points below the pipes 20. These pipes are provided with valves 25 for controlling the discharge of water therefrom, their outer ends being provided with flexible nozzles 26 in the form of short sections of hose. These nozzles 26 are normally disposed to discharge water downwardly into circular troughs 27 in surrounding relation to the trees or other vegetation. In this adaptation of my invention, the blower D can function as a pump and is adapted to be connected to a suitable source of water supply so that when the blower is operating it will function to pump water from the source through the piping system to the pipes 24. It will, of course, be understood that when the spraying and irrigating pipes are in use the valves 19 are closed, so as to prevent the discharge of fluid from the upper discharge ends of the pipes 17.

Although I have herein shown and described only one method and one apparatus for preventing the formation of frost on vegetation, each embodying my invention, it is to be understood that various changes and modifications may be made therein without departing from the spirit of the invention and the spirit and scope of the appended claims.

I claim as my invention:

1. A frost preventing apparatus comprising means for placing a fluid under pressure, and means for conducting the fluid to different and elevated points of discharge in respect to vegetation so as to produce currents of the fluid downwardly into contact with the earth and resultant upward currents, to thereby utilize warmth of the earth to raise the temperature of the rebounding fluid.

2. A frost preventing apparatus comprising means for placing air under pressure, and means for conducting the air and discharging it at different elevated points downwardly with respect to vegetation so as to produce air currents which impinge against the earth and rebound upwardly, to thereby utilize warmth of the earth to raise the temperature of the rebounding air.

3. An apparatus of the character described comprising a system of pipes including a main pipe having a plurality of coils, distributing pipes from the main pipe and branch pipes from the distributing pipes, vertically disposed and having their upper discharge ends so disposed as to discharge a fluid downwardly in proximity to vegetation, a fluid pressure device communicating with the main pipe for delivering fluid under pressure thereto, a heating element positioned with respect to the coils to heat the latter so that the fluid traversing the coils will likewise be heated, a motor for actuating the device, a circuit for the motor including a source of current, and a thermo-responsive switch for controlling the circuit in a manner to close it only when the temperature of the atmosphere adjacent the vegetation being treated is at or approaches the freezing point.

4. An apparatus as embodied in claim 3 wherein the branch pipes are provided with subsidiary branch pipes from which fluids may be discharged at points below the discharge ends of the branch pipes.

JAMES W. CROWHURST.